United States Patent [19]

Campos et al.

[11] Patent Number: 5,209,295
[45] Date of Patent: May 11, 1993

[54] IN-SITU REDUCTION OF OIL VISCOSITY DURING STEAM INJECTION PROCESS IN EOR

[75] Inventors: Rafael E. Campos; Jose A. Hernandez, both of Los Teques, Venezuela

[73] Assignee: Intevep, S.A, Caracas, Venezuela

[21] Appl. No.: 801,474

[22] Filed: Dec. 2, 1991

[51] Int. Cl.$^5$ ............................................. E21B 43/24
[52] U.S. Cl. .................................................. 166/303
[58] Field of Search ................................ 166/272, 303

[56] References Cited

U.S. PATENT DOCUMENTS

| | | | |
|---|---|---|---|
| 4,227,575 | 10/1980 | Nooner | 166/303 |
| 4,503,911 | 3/1985 | Hartman et al. | 166/272 |
| 4,549,609 | 10/1985 | Watkins et al. | 166/272 X |
| 4,572,296 | 2/1986 | Watkins | 166/303 |
| 4,580,633 | 4/1986 | Watkins et al. | 166/272 X |
| 4,982,789 | 1/1991 | Prukop | 166/272 |
| 5,105,887 | 4/1992 | Hewgill et al. | 166/272 X |

*Primary Examiner*—George A. Suchfield
*Attorney, Agent, or Firm*—Bachman & LaPointe

[57] ABSTRACT

A method for lowering the viscosity of a heavy hydrocarbon in situ in a well formation so as to improve well production wherein the heavy hydrocarbon has an API gravity in the range between 6° and 12° and a dynamic viscosity in the range between 300 and 900 centipoises @ 195° F. comprising lowering the viscosity of a virgin heavy hydrocarbon outside of a well formation wherein said heavy hydrocarbon has an API gravity in the range between 6 and 12 degrees and a dynamic viscosity above 300 centipoises @ 195° F. so as to make pumpable with conventional pumping equipment comprising mixing said hyrdocarbon at a temperature range between 400° and 500° F. with steam and an additive selected.

5 Claims, No Drawings

IN-SITU REDUCTION OF OIL VISCOSITY DURING STEAM INJECTION PROCESS IN EOR

BACKGROUND OF THE INVENTION

The present invention relates to the production of heavy hydrocarbons and, particularly, with treating heavy hydrocarbons to lower their viscosity either in situ or at surface facilities.

Heavy and extra heavy hydrocarbons with an API° gravity in the range between 6 and 12 and a dynamic viscosity of greater than 300 cps at 195° F. are difficult to produce from a subterranean formation by conventional methods due to their high viscosity. Several methods are disclosed in the art for recovering these heavy hydrocarbons and transporting them to the surface. One of the most used techniques is the steam injection technique wherein the viscosity of the hydrocarbons is temporarily thermally reduced thereby improving the hydrocarbon flowability to the surface. The steam injection into the formation can be done either by continuous steam drive or by cycle injection techniques. Both methods suffer from the disadvantage of a low hydrocarbon recovery and, in most cases the viscosity of the hydrocarbons after treatment is higher than the viscosity of the in situ hydrocarbon in the reservoir.

To overcome the forgoing disadvantages, several steam additives have been disclosed in the art, such as solvents and gases, for simultaneous injection with steam. Solvents, such as kerosene, diesel fuel or the like, are added to the heavy hydrocarbon to reduce the front flow profile and thereby lowering the oil viscosity of same. Gaseous additives, such as carbon dioxide, are used with the steam injection to enhance heavy hydrocarbon recovery in what is known as "gas lifting" processes to assist the hydrocarbon mixture in its way up to the surface of the production well. In these processes, however, the viscosity reduction of the hydrocarbon is temporary and reverts to its original viscosity once at the surface of the well.

Prior art surface treatment of viscous hydrocarbons to make them pumpable include heating the hydrocarbon, high temperature-high pressure treatment of the hydrocarbon and by introduction of a solvent as described above. These prior art systems suffer from a number of disadvantages. Firstly, these treatment processes require complex equipment for the high temperature-high pressure treatments which is quite costly. In addition, it has been found in the case of high temperature treatment processes that there is an increase in coke production when carrying out distillation of the crude.

It is desirable to have a method for the in situ lowering of the heavy hydrocarbon viscosity to enhance its recovery from the subsurface and ensure that the viscosity of the hydrocarbon does not revert with time after the hydrocarbon has been brought to the surface and later pumped by conventional transportation systems.

At the same time, it is desirable to provide a method of improving the viscosity of a virgin heavy hydrocarbons at the surface so as to allow the hydrocarbon to be transported by conventional pipeline systems and stored and handled by conventional techniques.

Accordingly, it is the principle object of the present invention to provide a method for the in situ lowering of the viscosity of a heavy hydrocarbon downhole at the well formation.

It is a further principle object of the present invention to provide a method for lowering the viscosity of a virgin heavy hydrocarbon, at the surface production facility, so as to allow them to be transported by conventional equipment.

Further objects, advantages and features of this invention will become more apparent to those skilled in the art from the following description and appended claims.

SUMMARY OF THE INVENTION

One of the foregoing objects is achieved by the method of the present invention wherein the viscosity of a heavy hydrocarbon is lowered in situ in a well formation so as to improve well production. The heavy hydrocarbon has an API° gravity in the range between 6 and 12 and a dynamic viscosity in the range between 300 and 900 centipoises at 195° F. comprises injecting a mixture of steam and urea into the well formation in a proportion of 2 to 5 percent in weight with respect to the total amount of $H_2O$ present into the well formation so as to reduce the viscosity of the heavy hydrocarbon by at least 50%.

The further object of this invention is achieved by providing a process for lowering the viscosity at the surface of the well of a virgin heavy hydrocarbon with dynamic viscosity above 300 centipoises at 195° F. so as to make it pumpable with conventional pumping equipment which comprises mixing said hydrocarbon at a temperature range between 400° and 500° F. with steam and urea and an additive selected from the group consisting of nickel, iron or mixtures thereof so as to reduce the viscosity of the heavy hydrocarbon by at least 25% and increase the 350+ distillation production by at least 50%.

DETAILED DESCRIPTION OF THE INVENTION

As noted above, it is highly desirable to provide effective processes for lowering the viscosity of a heavy hydrocarbon in a well formation so as to improve the well production. It has been found, in accordance with the present invention, that the thermal stimulation of a well formation by the injection of steam with urea has a favorable affect on the viscosity of the hydrocarbon in the well formation. In particular, it has been found that the viscosity of the heavy hydrocarbon may be lowered by a much as ten fold over the original viscosity of the hydrocarbon in the formation.

Thus, the present invention involves, in one aspect, a method for improving well production wherein steam and urea are simultaneously injected into a well formation. In accordance with the method of the present invention, the steam injection operation may be carried out in known conventional manner and can either be carried out continuously or intermittently. The steam with urea can be mixed at the well surface, can be mixed downhole in the well, or can be fed to the boiler feed water for making the steam. It has been found, in accordance with the present invention, that all three of the above alternatives work satisfactorally within the method of the present invention. It is critical in accordance with the method of the present invention that the urea be present in an amount of greater than or equal to 2% by weight with respect to the total amount of water in the aqueous/steam solution. It is preferred that the urea content be kept at a level of less than or equal to 20% by weight so as to prohibit acid polymerization of the hydrocarbon which has an adverse affect on the equipment used in oil well production. It has been found, in accordance with the present invention, that the steam injection of an aqueous solution of urea as asforesaid downhole in a well formation may lower the viscosity of the hydrocarbon in the well formation by up to ten fold of the original hydrocarbon viscosity.

In accordance with a further feature of the present invention it has been found that when treating heavy hydrocarbons outside of the well formation (enclosed reactors) the viscosity of the heavy hydrocarbon can be improved by adding to the reactor an aqueous steam mixture of urea and an additive selected from the group consisting of nickel, iron or mixtures thereof as a water soluble compound. In accordance with this further method of the present invention, the virgin heavy hydrocarbon is treated in a closed reactor at a temperature in the range of between 400°-500° F. with an aqueous mixture of steam, urea and an additive of nickel, iron or mixtures thereof wherein the urea content is in a proportion in the range of greater than or equal to 2-5% by weight with respect to the total water content of the mixture and the metal additive is added in an amount of about between 1000-5000 ppm. By treating a virgin hydrocarbon by the method as asforesaid, the viscosity of the hydrocarbon is lowered by as much as 25%. As noted above, the nickel and iron additive is in the form of a water soluble compound and may take the form of nickel sulfate, iron sulfate or other suitable compound.

In addition to lowering the viscosity of the heavy hydrocarbon, it has been found that when treating well formations and virgin hydrocarbons as set forth above, the hydrocarbons yield a greater amount of light hydrocarbons when distilled when compared to the same untreated hydrocarbons. This improvement in yields at low temperatures is experienced with both downhole treatment of heavy hydrocarbons and treatment of virgin hydrocarbons as discussed above.

The advantages of the methods of the present invention will be made clear from a consideration of the following illustrative examples.

EXAMPLE I

In order to demonstrate the methods of the present invention two heavy hydrocarbons from the Orinoco belt of Venezuela were tested. These hydrocarbons known as Hamaca and Cerro Negro crude oils, have the chemical and physical properties set forth hereinbelow in Table I.

TABLE I

| PROPERTY | HAMACA | CERRO NEGRO |
|---|---|---|
| API° GRAVITY | 10.6 | 8.4 |
| VISCOSITY @ 195° F. cps | 458 | 588 |
| MOLECULAR WEIGHT | 548 | 587 |
| H/C RATIO | 0.125 | 0.124 |
| SULPHUR CONTENT (% WT) | 4.08 | 4.06 |
| NICKEL CONTENT ppm | — | 97.2 |
| VANADIUM CONTENT ppm | 387.5 | 447.3 |

In order to demonstrate the value of the method of the present invention in lowering the viscosity of heavy hydrocarbons downhole in well formations, six whole core samples were processed. Three first whole core samples from Hamaca well formation whose characteristics are set forth in Table I, and three additional samples employing the Cerro Negro Crude which characteristics are also set forth in Table I were placed in a reactor. Each of the three samples from different crude were then filled with distilled water until the oil to water ratio in the reactor was 1.08. The first of each reactor contained only distilled water, the second of each reactor contained an aqueous solution of 1% urea and the third of each reactor contained an aqueous solution of 2% urea. Each of the three samples were thereafter treated identically in accordance with the following procedure: The reactors were heated to a temperature of 382 degrees F and held at that temperature for a ten day period so as to simulate the steam injection into the well formation. After cooling of the reactor the solid-liquid mixtures from each vessel were treated to recover the hydrocarbon by using an extraction solvent system such as a SOXHLET system, well known in the art, and which allows the water, sand and hydrocarbon phases to be separated. The viscosity of the separated oil was measured by a Brookfield VLTD viscosimeter (plate-cone type) at a temperature of 195 degrees F. The dynamic viscosities of these crudes treated by the above processes is set forth hereinbelow in Table II.

TABLE II

| | DYNAMIC VISCOSITY IN CPS @ 195° F. | |
|---|---|---|
| | CRUDE | |
| STEAM INJECTION | HAMACA | CERRO NEGRO |
| WITHOUT ADDITIVE | 670 | 634 |
| STEAM (+) UREA 1% | 283 | 256 |
| STEAM (+) UREA 2% | 61 | 49 |

As can be seen from Table II, the treatment with steam by itself actually leads to an increase in the hydrocarbon viscosity. The treatment with a mixture of steam and 1% urea had a favorable effect on viscosity of the crude oils. The treatment with steam and 2% urea had a dramatic effect on the viscosities of both crude oils and in fact lowered the viscosity by about ten fold.

EXAMPLE II

This example demonstrates the effect of steam, urea and an additive selected from the group consisting nickel and iron on the viscosity of heavy Hamaca and Cerro Negro crude oils when treated at the surface of a well. Three samples each were made of Cerro Negro crude and Hamaca crude. The crudes were located in reactor vessels and admixed with distilled water. No core sand was used in any of the vessels thereby simulating treatment of the crudes outside of the well formation. The first sample of each crude was mixed with distilled water in a crude to water ratio of 1.08. The second sample of each crude was mixed with distilled water and an addition of 2% urea and nickel sulfate so as to produce a nickel content of 1200 ppm. The third sample of each crude included a 2% urea addition with an addition of iron sulfate so as to obtain an iron content of 1200 ppm. These samples were there after subjected to the same simulated feed steam treatment noted above with regard to Example I and the crudes were there after separated and the viscosities measured. The results of the tests are set forth below in Table III.

TABLE III

| | DYNAMIC VISCOSITY IN CPS @ 195° F. | |
|---|---|---|
| | CRUDE | |
| STEAM MIXING | HAMACA | CERRO NEGRO |
| WITHOUT ADDITIVE | 1060 | 497 |

TABLE III-continued

| DYNAMIC VISCOSITY IN CPS @ 195° F. | | |
|---|---|---|
| | CRUDE | |
| STEAM MIXING | HAMACA | CERRO NEGRO |
| STEAM (+) UREA 2% + Ni | 373 | 320 |
| STEAM (+) UREA 2% + Fe | 366 | 300 |

Again, as was the case in Example I, steam treatment alone has a negative effect on the viscosities of the crudes. However, the use of urea and the metal addition has a beneficial affect on the viscosity of the crude oils.

In order to demonstrate the beneficial affect that the method of the present invention have on distillate products yield at temperature ranges of 300° to 350° C. the samples of Example I were subjected to conventional distillation process. The results are set forth below in Table IV as can be seen from Table IV the Cerro Negro crude having 2% urea has a dramatic increase in percent distillates at 300° C. and 350° C. over Cerro Negro without the urea addition.

TABLE V

| FEEDSTOCK | % DESTILLATES @ 300° C. | % DESTILLATES @ 350 |
|---|---|---|
| Cerro Negro + 2% urea | 12.5 | 18.5 |
| Cerro Negro + 1% urea | 9.0 | 15.0 |
| Cerro Negro | 7.0 | 13.0 |

The foregoing examples clearly demonstrate the value of the methods of the present invention.

This invention may be embodied in other forms or carried out in other ways without departing from the spirit or essential characteristics thereof.

What is claimed is:

1. A method for lowering the viscosity of a heavy hydrocarbon in situ in a well formation so as to improve well production wherein the heavy hydrocarbon has an API° gravity in the range between 6 and 12 and a dynamic viscosity in the range between 300 and 900 centipoises 195° F. comprising:

injecting a mixture of steam and an aqueous solution of urea in a proportion of greater than or equal to 2% by weight with respect to the total amount of $H_2O$ in the aqueous solution so as to reduce the viscosity of the heavy hydrocarbon by at least 50%.

2. The method according to claim 1 including mixing the steam with an aqueous solution of urea in a ratio of steam to urea in an amount of about 4:1.

3. The method according to claim 1 including mixing the aqueous urea solution to the steam at the surface.

4. The method according to claim 1 including adding the aqueous urea solution to steam downhole.

5. The method according to claim 1 wherein the urea content is between 2 and 15% by weight.

* * * * *

UNITED STATES PATENT AND TRADEMARK OFFICE
CERTIFICATE OF CORRECTION

PATENT NO. : 5,209,295

DATED : May 11, 1993

INVENTOR(S) : RAFAEL E. CAMPOS, JOSE A. HERNANDEZ

It is certified that error appears in the above-identified patent and that said Letters Patent is hereby corrected as shown below:

In column 6, claim 1, line 19, before "195°" insert --@--.

Signed and Sealed this

First Day of March, 1994

Attest:

BRUCE LEHMAN

Attesting Officer

Commissioner of Patents and Trademarks